L. G. HARDY.
HARROW.
APPLICATION FILED DEC. 6, 1917.
1,281,358.
Patented Oct. 15, 1918.
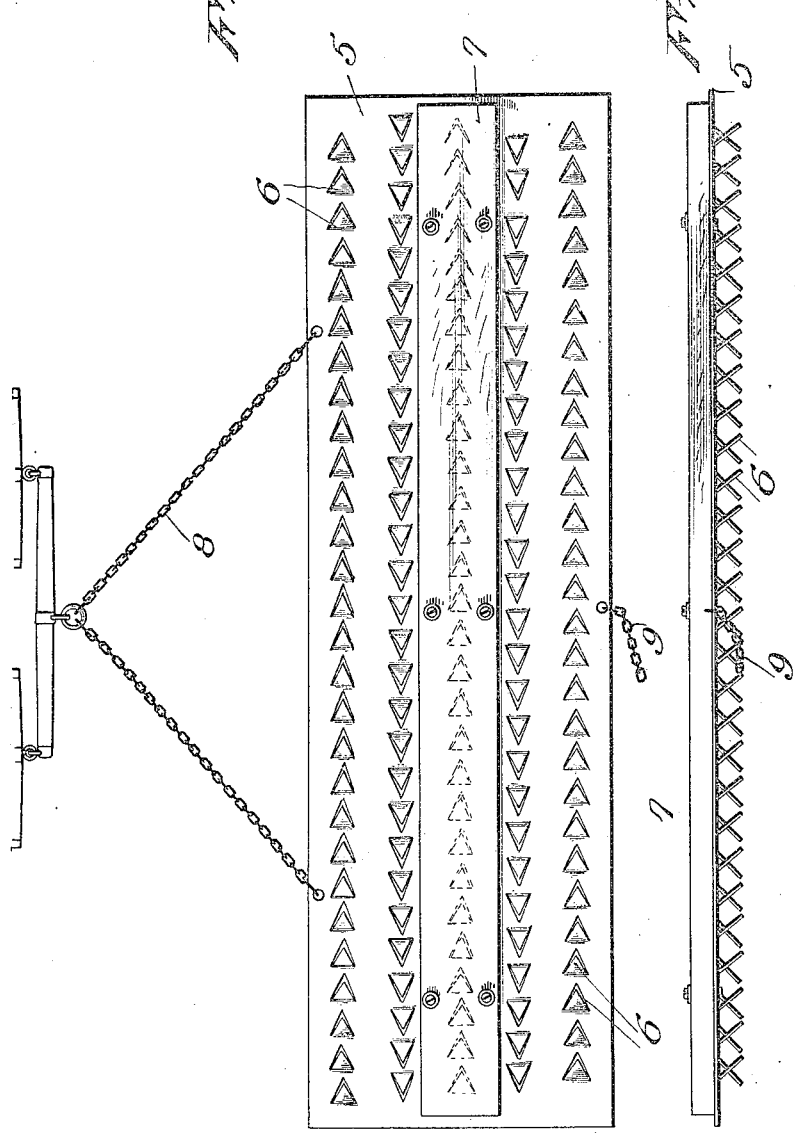
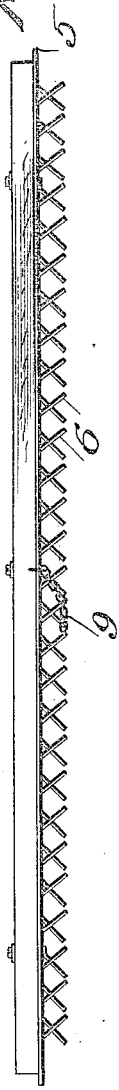
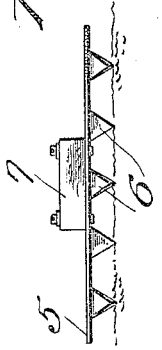
Inventor
L. G. Hardy.

UNITED STATES PATENT OFFICE.

LEONARD G. HARDY, OF SALT LAKE CITY, UTAH.

HARROW.

1,281,358. Specification of Letters Patent. Patented Oct. 15, 1918.

Application filed December 6, 1917. Serial No. 205,775.

*To all whom it may concern:*

Be it known that I, LEONARD G. HARDY, a citizen of the United States, residing at Salt Lake City, in the county of Salt Lake and State of Utah, have invented new and useful Improvements in Harrows, of which the following is a specification.

This invention has for its object to provide a simple, cheap and efficient harrow for pulverizing and leveling the soil, and to this end it consists in a novel combination and arrangement of parts to be hereinafter described and claimed.

In order that the invention may be better understood, reference is had to the accompanying drawing forming a part of this specification.

In the drawing,

Figure 1 is a plan view of the implement; Fig. 2 is a rear elevation thereof, and Fig. 3 is an end view.

Referring specifically to the drawing, 5 denotes a sheet metal plate which is slitted and has bent out portions to form depending harrow teeth 6. The slits are V-shaped and the metal therebetween is bent outward so that sharp, V-shaped teeth are produced. Referring to Fig. 1 of the drawing, it will be seen that the teeth are arranged in transverse rows, there being five rows of teeth, which latter, however, can be varied as desired. The respective rows of teeth are inclined alternately in opposite directions, the teeth of one row being inclined to the left and the teeth of the next row to the right, so that the teeth of adjacent rows cross. Referring to Fig. 1 of the drawing it will also be noted that the teeth of alternate rows are out of alinement or staggered, so that no two teeth travel in the same path but each tooth has a separate path, in view of which it will be seen that the soil is closely worked and thoroughly pulverized. As the teeth are V-shaped, their forward edges are inclined as shown in Fig. 2.

A transverse plank 7 is bolted down on top of the plate 5 to stiffen the same, and also serves as a carrier for a weight or a seat for the driver.

A draft chain 8 is attached to the front portion of the plate 5, and to the rear is attached a dump chain 9.

A harrow constructed as hereinbefore described is simple in construction and it can be cheaply produced. In operation, the harrow thoroughly pulverizes the soil and forms a fine mulch, which greatly retards evaporation of the moisture from the soil. The implement also acts as a leveler, and it prepares a fine seed bed, especially for beet seed, or any small seeds that need shallow planting. The implement is also an ideal harrow for orchards, as it cuts up all weeds, leaving the soil in the best condition for retaining the moisture.

I claim:—

1. A harrow comprising a sheet metal plate provided with integral depending teeth arranged in transverse rows and having a lateral inclination, the teeth of the respective rows being inclined in opposite directions.

2. A harrow comprising a sheet metal plate provided with integral depending teeth arranged in transverse rows and having a lateral inclination, the teeth of the respective rows being inclined in opposite directions, and the teeth of alternate rows being also staggered.

In testimony whereof I affix my signature.

LEONARD G. HARDY.

Copies of this patent may be obtained for five cents each, by addressing the "Commissioner of Patents, Washington, D. C."